(12) United States Patent
King et al.

(10) Patent No.: US 12,329,151 B2
(45) Date of Patent: Jun. 17, 2025

(54) ION ENHANCEMENT

(71) Applicant: King Technology, Inc., Minnetonka, MN (US)

(72) Inventors: Joseph A. King, Wayzata, MN (US); John Hill, Plymouth, MN (US); Nicole A. Weulander, Savage, MN (US)

(73) Assignee: King Technology, Inc., Minnetonka, MN (US)

( * ) Notice: Subject to any disclaimer, the term of this patent is extended or adjusted under 35 U.S.C. 154(b) by 284 days.

(21) Appl. No.: 17/114,172

(22) Filed: Dec. 7, 2020

(65) Prior Publication Data

US 2021/0084894 A1    Mar. 25, 2021

Related U.S. Application Data

(63) Continuation of application No. 13/986,763, filed on Jun. 4, 2013, now abandoned, which is a continuation
(Continued)

(51) Int. Cl.
*A01N 25/00* (2006.01)
*A01N 59/16* (2006.01)
(Continued)

(52) U.S. Cl.
CPC .............. *A01N 25/00* (2013.01); *A01N 59/16* (2013.01); *C02F 1/50* (2013.01); *C02F 1/505* (2013.01);
(Continued)

(58) Field of Classification Search
CPC ........ A01N 25/00; A01N 25/08; A01N 25/10; A01N 25/12; A01N 25/26; A01N 25/14;
(Continued)

(56) References Cited

U.S. PATENT DOCUMENTS 3,591,010 A    7/1971    Pall et al.
3,950,253 A    4/1976    Stern
(Continued)

FOREIGN PATENT DOCUMENTS

GB    1583104 A    1/1981
JP    H01315387 A    12/1989
(Continued)

OTHER PUBLICATIONS

Lonza Material Safety Data Sheet for Dantochlor Oct. 1, 2007, 6 pages. (Year: 2007).*
(Continued)

*Primary Examiner* — Clare M Perrin
(74) *Attorney, Agent, or Firm* — Fredrikson & Byron, P.A.

(57) ABSTRACT

A method and apparatus for treating a body of water to kill microorganisms by enhancing the concentration metal ions therein. The apparatus comprising a dispenser with a first housing having a water accessible compartment containing a source of a N-halohydantoin compound for releasing the N-halohydantoin compound when contacted by the body of water with the at least one N-halohydantoin having the formula:

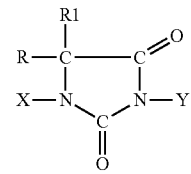

wherein R and R1 each independently comprises an alkyl group, and wherein X and Y are independently selected from
(Continued)

the group consisting of bromine, chlorine and hydrogen and a second housing having a water accessible compartment containing an insoluble metal ion donor for releasing metal ions when contacted by the body of water containing the N-halohydantoin.

8 Claims, 5 Drawing Sheets

Related U.S. Application Data of application No. 12/386,109, filed on Apr. 14, 2009, now abandoned, and a continuation-in-part of application No. 12/001,351, filed on Dec. 11, 2007, now abandoned.

(60) Provisional application No. 61/126,105, filed on May 1, 2008, provisional application No. 60/878,016, filed on Dec. 29, 2006.

(51) Int. Cl.
  *C02F 1/50* (2023.01)
  *C02F 1/68* (2023.01)
  *C02F 1/76* (2023.01)
  *C02F 103/42* (2006.01)

(52) U.S. Cl.
  CPC ........... *C02F 1/688* (2013.01); *C02F 1/76* (2013.01); *C02F 1/766* (2013.01); *C02F 2103/42* (2013.01)

(58) Field of Classification Search
  CPC ........ A01N 25/22; A01N 25/24; A01N 25/28; A01N 25/30; A01N 25/32; A01N 59/00; A01N 59/16; A01N 59/18; A01N 59/20; A01N 59/22; C02F 2103/42; C02F 2201/006; C02F 1/50; C02F 1/52; C02F 1/5227; C02F 1/62; C02F 1/5281; C02F 1/5236; C02F 1/685; C02F 1/687; C02F 1/688; C02F 1/76; C02F 1/766; C02F 1/505; C02F 1/4606
  See application file for complete search history.

(56) References Cited

U.S. PATENT DOCUMENTS

| | | | |
|---|---|---|---|
| 4,043,932 A | 8/1977 | Fresenius et al. | |
| 4,504,387 A | 3/1985 | Lemire et al. | |
| 4,680,114 A | 7/1987 | Hayes | |
| 4,698,165 A | 10/1987 | Theyson | |
| 4,923,619 A | 5/1990 | Legros | |
| 4,935,116 A | 6/1990 | Lemire | |
| 5,011,602 A | 4/1991 | Totani et al. | |
| 5,149,354 A | 9/1992 | Delaney | |
| 5,352,369 A | 10/1994 | Heinig, Jr. | |
| 5,364,512 A | 11/1994 | Earl | |
| 5,449,658 A | 9/1995 | Unhoch et al. | |
| 5,516,501 A | 5/1996 | Kelley | |
| 5,562,824 A | 10/1996 | Magnusson | |
| 5,660,802 A | 8/1997 | Archer et al. | |
| 5,772,896 A | 6/1998 | Denkewicz, Jr. et al. | |
| 5,814,233 A | 9/1998 | Starkey et al. | |
| 5,882,526 A | 3/1999 | Brown et al. | |
| 5,888,428 A * | 3/1999 | Howarth ............... | C02F 1/766 210/764 |
| 6,019,893 A | 2/2000 | Denkewicz, Jr. et al. | |
| 6,086,746 A | 7/2000 | Nalepa | |
| 6,093,422 A | 7/2000 | Denkewicz, Jr. et al. | |
| 6,120,698 A | 9/2000 | Rounds et al. | |
| 6,190,547 B1 | 2/2001 | King et al. | |
| 6,328,900 B1 | 12/2001 | King | |
| 6,447,722 B1 | 9/2002 | Rakestraw | |
| 6,508,929 B1 | 1/2003 | Mercer | |
| 6,592,766 B2 | 7/2003 | King | |
| 6,743,372 B1 | 6/2004 | Kleinstck et al. | |
| 6,749,758 B2 | 6/2004 | Howarth et al. | |
| 6,863,830 B1 | 3/2005 | Purdy et al. | |
| 7,052,615 B2 | 5/2006 | King et al. | |
| 7,347,934 B2 * | 3/2008 | King ............... | C02F 1/505 210/206 |
| 7,501,067 B2 | 3/2009 | King et al. | |
| 7,875,191 B2 | 1/2011 | King et al. | |
| 9,187,351 B2 * | 11/2015 | King ............... | A01N 59/16 |
| 2003/0077365 A1 | 4/2003 | Howarth | |
| 2003/0186955 A1 | 10/2003 | Vange et al. | |
| 2004/0108261 A1 | 6/2004 | King et al. | |
| 2004/0129644 A1 | 7/2004 | Unhoch | |
| 2004/0168963 A1 | 9/2004 | King et al. | |
| 2005/0161408 A1 | 7/2005 | Costa et al. | |
| 2005/0183961 A1 * | 8/2005 | Morrissey ............ | C25D 3/46 205/263 |
| 2006/0005316 A1 | 1/2006 | Durrant | |
| 2006/0032803 A1 | 2/2006 | Costa et al. | |
| 2006/0043011 A1 * | 3/2006 | King ............... | C02F 1/688 210/754 |
| 2006/0049119 A1 | 3/2006 | Ludensky et al. | |
| 2006/0169649 A1 | 8/2006 | Hsueh et al. | |
| 2006/0219641 A1 | 10/2006 | Kepner et al. | |
| 2006/0266682 A1 | 11/2006 | Kennedy et al. | |
| 2007/0045199 A1 | 3/2007 | Mayer et al. | |
| 2007/0084803 A1 | 4/2007 | Costa et al. | |
| 2007/0158274 A1 | 7/2007 | King | |
| 2008/0128363 A1 | 6/2008 | Costa et al. | |
| 2008/0156739 A1 | 7/2008 | King | |
| 2009/0200246 A1 | 8/2009 | King et al. | |

FOREIGN PATENT DOCUMENTS

| | | | |
|---|---|---|---|
| JP | H08502925 A | | 4/1996 |
| JP | H-085029250 A | * | 4/1996 |
| JP | 2004509907 A | * | 4/2004 |
| KR | 20030072079 A | * | 9/2003 |
| KR | 1020030072079 A | | 9/2003 |
| KR | 20060117877 A | * | 11/2006 |
| KR | 1020060117877 A | | 11/2006 |
| KR | 100802889 B1 | * | 2/2008 |
| WO | 0034186 A1 | | 5/2001 |
| WO | 2007011445 A2 | | 1/2007 |
| WO | 2011056203 A2 | | 5/2011 |

OTHER PUBLICATIONS

Dantochlor Trademark Registration. United States Patent and Trademark Office (Sep. 22, 1987) 1 page. (Year: 1987).*
Altman Chemicals—Dantochlor (2015) 1 page. (Year: 2015).*
Silver Chloride, Wikipedia, Jan. 31, 2005, 1 page. (Year: 2005).*
WayBackMachine for Silver Chloride, Wikipedia showing publication date of Jan. 31, 2005, 1 page. (Year: 2005).*
Machine translation of JP-2004509907-A, pp. 1-17 (Year: 2004).*
Machine translation of KR-20030072079-A, pp. 1-17. (Year: 2003).*
Machine translation of KR-20060117877-A, pp. 1-12. (Year: 2006).*
Dantochlor Pesticide Product Labelling Communication from the FDA, 2003, pp. 1-6. (Year: 2003).*
Guidelines for safe recreational water environments, WHO, 2006, pp. 1-146. (Year: 2006).*
Machine translation of JPH-085029250A, pp. 1-8. (Year: 1996).*
Swimming Pool Operator Course, Environmental Health (Year: 2008).*
Osinski. Pool Tip #2, BCDMH, pp. 1-159. (Year: 2006).*
Dantochlor Pesticide Product Labelling Communication from the EPA, 2003. (obtained from iaspub.epa.gov/apex/pesticides on Feb. 2012). See Notice of Allowance with PTO-892.
European Patent Office "European Search Report and Written Opinion" , From Application No. EP 07868053.5, Dated Mar. 22, 2011, pp. 8.
International Searching Authority "International Preliminary Report on Patentability and Written Opinion" From Application No. PCT/US2007/026374, Mailed Apr. 29, 2008, pp. 10.

(56) References Cited

OTHER PUBLICATIONS

International Searching Authority "International Search Report and Written Opinion" From Application No. PCT/US2009/02409, mailed Nov. 30, 2009, pp. 8.
International Searching Authority "Preliminary Report on Patentability and Written Opinion" From Application No. PCT/US2010/002851, Mailed Jun. 28, 2011, pp. 11.
Swimming Pool Operators. Course, Environmental Health, Job#1710, See Notice of Allowance on PTO-892.
Guidelines for safe recreational water environments, (vol. 2: Swimming pools and similar environments), World Health Organization 2006, See Notice of Allowance with PTO-892.
Pool Tip #2: BCDMH, Alison Osinski, PhD.—Aquatic Consulting Services, 2006, See Notice of Allowance with PTO-892.

* cited by examiner

ION ENHANCEMENT

This application is a continuation application of now abandoned U.S. application Ser. No. 13/986,763 filed on Jun. 4, 2013, titled ION ENHANCEMENT, which is a continuation in part of now abandoned U.S. application Ser. No. 12/001,351 filed on Dec. 11, 2007, titled ION ENHANCEMENT, which claims priority to provisional application Ser. No. 60/878,016 filed on Dec. 29, 2006, and U.S. application Ser. No. 13/986,763 is further a continuation of now abandoned U.S. application Ser. No. 12/386,109 filed on Apr. 14, 2009 titled ION ENHANCEMENT, which claims priority to U.S. Provisional Application Ser. No. 61/126,105 filed on May 1, 2008, titled ION ENHANCEMENT, which are all hereby incorporated by reference in their entireties.

FIELD OF THE INVENTION

This invention relates generally to water treatment and more specifically, to the combination of a metal ion donor and a source of a N-halohydantoin compound such as Dichlorodimethylhydantoin to enhance the effectiveness of the metal ion donor in killing microorganisms in a body of water.

CROSS REFERENCE TO RELATED APPLICATIONS

This application claims priority to currently U.S. Provisional Application Ser. No. 61/126,105; filed on May 1, 2008; titled ION ENHANCEMENT.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of treating a body of water with a source of metallic ions to kill bacteria in the body of water is known in the art. Metallic ions such as a silver ion is an effective bactericide for a body of water including recreational water such as swimming pools, spas, jetted tubs or the like and is a preferred material because it is generally easier and safer to use when compared to other known bactericides or algaecides. A further advantage of using silver ion as a bactericide is that silver ion minimizes the need for pH adjustment to the body of water. However, if the concentration of metallic ions such as silver ions in a body of water is too low the ability to kill microorganisms is reduced or lost. Conversely, if the concentration of metallic ions such as silver ions is too high it can potentially lead to undesired effects such as causing the user's skin to turn yellow and staining clothes. Thus when silver ion is used as a disinfectant in a body of water one generally wants to maintain the concentration of the silver ion in a range that is effective killing microorganisms without leading to the undesired effects associated with higher levels of silver ions.

Traditionally, the sources of metallic ions used to kill bacteria in recreational water have been limited to metallic ion donors that are readily soluble in the recreational water in order to maintain an effective concentration of the biocides in the body of water. Silver chloride (AgCl), for example, has been a commonly used bactericide for releasing silver ions into the body of water to effectively kill microorganisms. Sodium bromide has also been known to be used with silver chloride to provide an additional and alternative water disinfection system.

One of the problems associated with the use of silver for killing microorganisms is that silver has a tendency to complex with other compounds and become increasingly insoluble thereby reducing the effective microorganisms killing ability of the silver. For example, it would not be anticipated that silver chloride when used in combination with sodium bromide would be an effective prolong disinfectant system because of the combination's tendency to form insoluble silver bromide crystals, which are not believed to be biologically active in aqueous environments. However, it has been discovered that if silver forms a complex with hydantoins, the silver will remain soluble to a higher degree thereby retaining the silver's antimicrobial activity.

The present invention comprises a device and method for using metal ion donors in combination with a hydantoin-based structure to enhance a concentration of the metal ions in the body of water or to enhance the solubility of metal ions from other metal ion donors to retain the silver's antimicrobial activity in the water.

SUMMARY OF THE INVENTION

Briefly, the present invention comprises a method and a device for killing microorganisms in a body of water through the enhancement of a concentration of metal ion donor even in situations where the metal ion donors are generally insoluble or not sufficiently soluble in the body of water to maintain an effective concentration of the metal ion donor in soluble form in the body of water. The device generally comprises a first housing having a water accessible compartment containing a source of a N-halohydantoin compound such as Dichlorodimethylhydantoin for releasing the Dichlorodimethylhydantoin compound when contacted by the body of water and a second housing having a water accessible compartment containing a metal ion donor for releasing metal ions to kill the microorganisms in the body of water when contacted by water containing the Dichlorodimethylhydantoin compound to thereby increase the effectiveness of the metal ion donor.

The method includes the steps of adding a metal ion donor to the body of water and adding sufficient Dichlorodimethylhydantoin compound to the body of water to interact with the metal ion donor to enhance the metal ion concentration to effectively to kill microorganisms. A further embodiment includes the tabletizing of the Dichlorodimethylhydantoin compound with a metal ion donor so that the combination can be placed in a body of water to be disinfected.

DESCRIPTION OF THE PREFERRED EMBODIMENT

Figure 1:
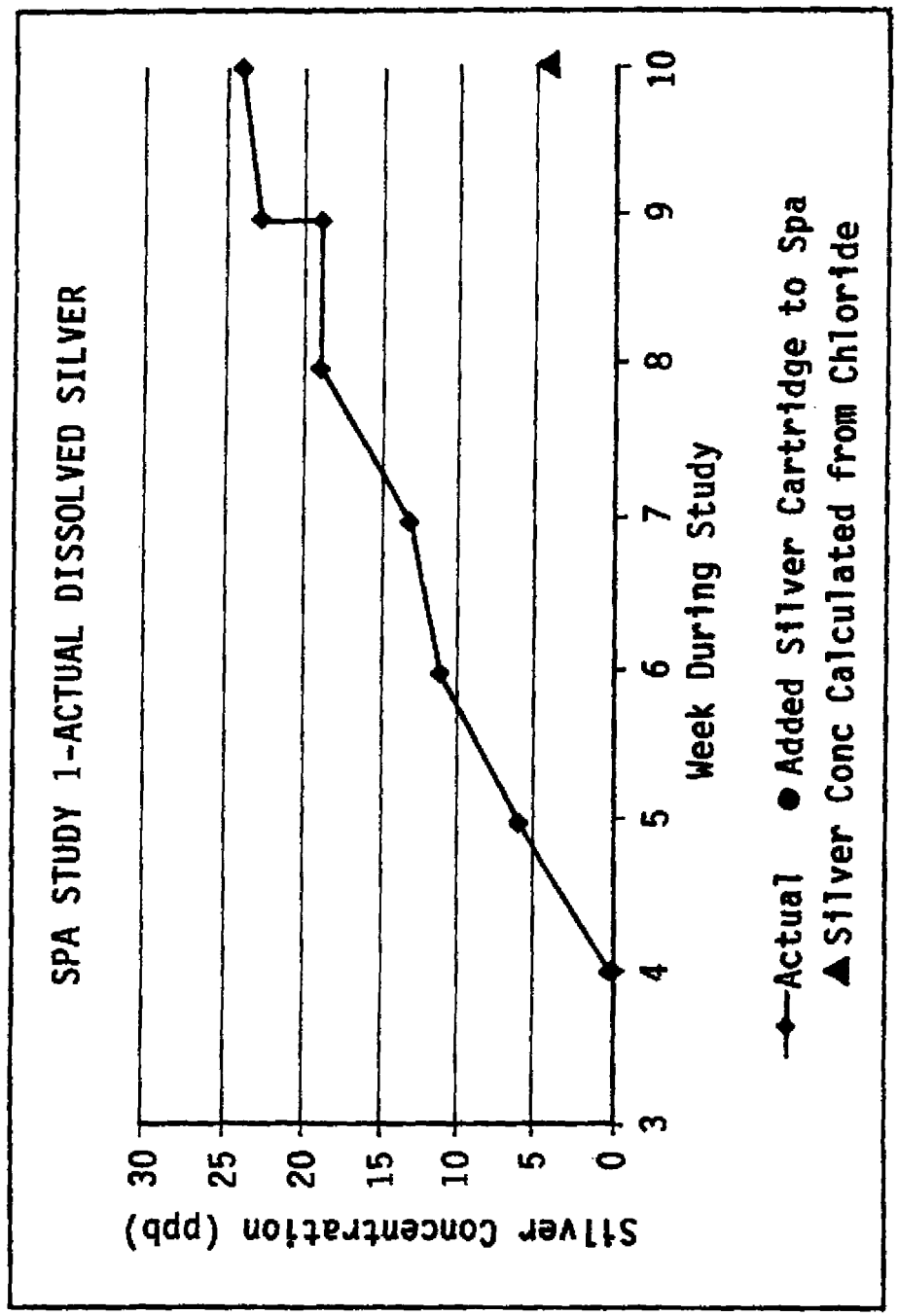
FIG. 1 shows a graph of the measured dissolved silver concentrations each week for the duration of a Spa Study 1.

Hydantoin structures are known complexing agents in silver-plating processes (R. J. Morrissey, U.S. Patent Application Publication no. 2005/0183961). Studies performed by the inventor have demonstrated that unhalogenated hydantoins, such as 5,5-dimethylhydantoin (DMH), tend to increase levels of dissolved silver. Studies performed by the inventor have also demonstrated the halogenerated hydantoin such as Bromochlorodimethylhydantoin (BCDMH) also tends to increase levels of dissolved silver. While not fully understood it is believed that the aforementioned increased in solubility is due to the soluble complex between silver and hydantoin ring structures as it has been found the silver remains soluble to a higher degree than expected.

The present invention has found that the qualities to interact with metal ion donors such as silver chloride or silver bromide to increase the solubility of the silver chloride or silver bromide in a water environment and aid in the disinfection process is not limited to just the halogenerated hydantoin BCDMH alone but may include a broader category of N-halohydantoin compounds. For example, the inventor has discovered that in addition to BCDMH, the N-halohydantoin compound Dichlorodimethylhydantoin (DCDMH), which has been used commercially in household automatic toilet bowl cleaners and urinals, may also properly interact with silver from sources such as silver chloride or silver bromide in a body of recreational water such as spas, jetted tubs, swimming pools or the like to form a soluble complex to enhance the effectiveness of the silver in killing or controlling microorganisms in the body of recreational water.

In order to verify the above, spa tests were performed using silver chloride as the donor of metal ions to demonstrate the enhancement of a silver concentration in a body of water when other types of N-halohydantoin compounds such as DCDMH were used in combination.

In the tests, a 450-gallon Marquis® brand spa was used in performing 3 tested to evaluate the potential use of DCDMH to increase silver solubility in the presence of alternative disinfection systems such as sodium bromide. The spa comprised a dimensioned of 90"×90"×35.5" with a water depth of approximately 25" without bathers. The spa featured 43 jets and two pleated filter cartridges (Unicel 5CH-502), each having a filtration area of 50 square feet. Spa water was maintained between 100° F. (37.8° C.) to 104° F. (40° C.) and was circulated at least 2 hours daily.

In all three tests, the Dichlorodimethylhydantoin (DCDMH, CAS No. 118-52-5) used was obtained from two sources, namely Aldrich® and Lonza, Inc. located in Fair Lawn, New Jersey. The DCDMH obtained from Aldrich® comprised a fine powder material of 1,3-Dichloro-5,5-dimethylhydantoin with a 98% purity. The Lonza DCDMH (Dantochlor®) comprised a combination of 80-83% 1,3-Dichloro-5,5dimethylhydantoin, 16-17% 1,3-Dichloro-5-ethyl-5-methylhydantoin, 0-2% monochloro-5-methylhydantoin. The DCDMH was introduced into the spa via spa cartridges, which were fabricated by adding approximately 75-100 grams of DCDMH or Dantochlor to an empty Spa Frog® BCDMH cartridge.

The source of silver ions was obtained from a King Technology Inc. Spa Frog® Mineral Cartridge, which was randomly selected from King Technology Inc.'s production inventories for use in these tests and installed into an in-line system on the spa. These mineral cartridges release silver ions into the spa in the form of silver chloride. A different cartridge was used in each of the three studies.

During all three tests, the spa was filled with fresh water prior to the initiation of each of the three tests and the water balanced according to Taylor Technologies Pool & Spa Water Chemistry Manual. The pH of the water was reduced by the addition of sodium bisulfate (pH Down Balancer, GLB, Alpharetta, GA) to a range between 7.2 and 8.0. In Studies 2 and 3, a cartridge containing the DCDMH was then installed into the In-Line Frog System of the spa at the same time that the Spa Frog Mineral Cartridge (silver source) was installed into the In-Line Frog System of the spa. In Study 1, a Spa Frog® Mineral Cartridge (silver source) was installed into the In-Line Frog System of the spa. A cartridge containing the DCDMH was installed into the In-Line Frog System of the spa three weeks after the start of the testing period.

In Spa Study 1, water samples were taken and tested for a ten week period. In Spa Study 2, water samples were taken and tested for a seventeen week period. And for Spa Study 3, water samples were taken and tested for a seven week period. It is noted that in Spa Study 3, bathers were also introduced to the spa water three weeks after the start of the testing period to test the affect that bathers had on the spa water.

The Spa Frog® Mineral Cartridge was used to provide silver ions from solid silver chloride (AgCl) distributed over a porous matrix. Water flowing through the matrix comes into contact with the AgCl resulting in the release of soluble silver ions to water. DCDMH is also released to water resulting in the formation of free chlorine and hydantoin structures. It would be anticipated that soluble silver ions would be depleted from spa water through the formation of silver chloride, an insoluble salt. However, during each of the three spa studies the actual silver concentration was higher than the calculated theoretical silver concentration. This is due to the formation of a novel silver-hydantoin complex, which we previously described. Although silver chloride is described above as providing for the source of silver ion, in the present embodiment the source of silver ion may also comprises pure silver, silver metals, silver alloy or some combination thereof because of the recognized bactericidal, viricidal, and algaecidal properties of silver. The silver metals can be introduced as metallic, zero valence material, or as metal ions that can be introduced into the water by dissolution of soluble metal salts, or by the dissolution of the metal itself. For example, silver ion can be introduced into the water through the dissolution of silver nitrate, or through the dissolution of metallic silver as the result of conversion to silver oxide and subsequent conversion of the oxide to more soluble silver species. Mixtures of different salts, or of salts with metallic material, may be combined together to provide the necessary concentration of metal ions in the water.

Water Testing

Chemical tests were performed with water samples obtained from each of the three spa studies for the chlorine concentration and also, the dissolved silver concentration. Additionally, the spa water's total alkalinity, turbidity, and pH were also tested and maintained within ranges accepted by the industry. The ideal pH for a spa is 7.20 to 7.60, however wider ranges are acceptable. In the studies, the average pH for Spa Study 1 was 7.31, Spa Study 2 showed an average pH of 7.27, and Spa Study 3 had an average pH of 7.37, which were all within the low end of the ideal pH for a spa.

Figure 2:
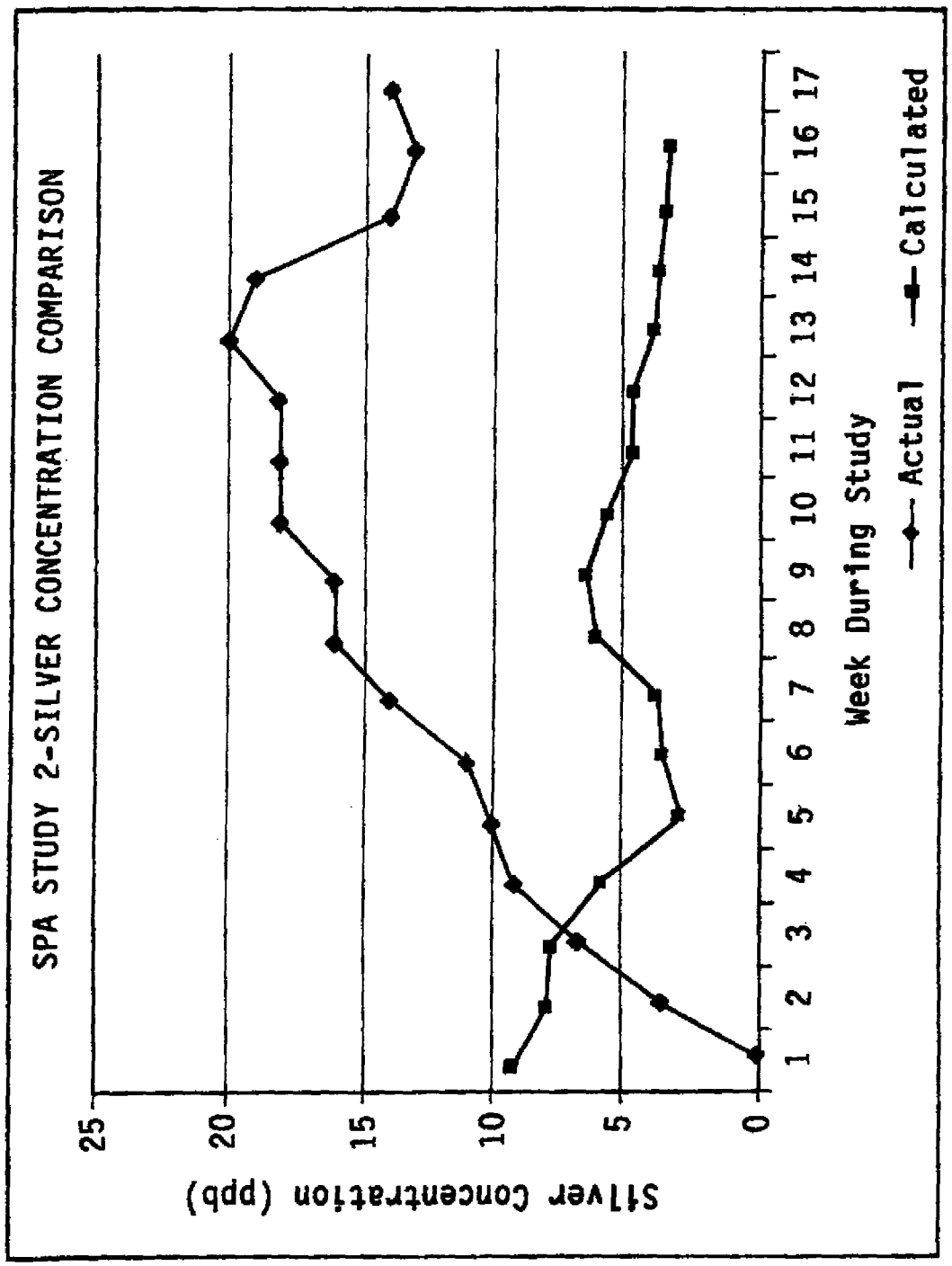
FIG. 2 shows a graph of the measured dissolved silver concentrations each week for the duration of a Spa Study 2 as compared to the theoretical calculations.
Figure 3:
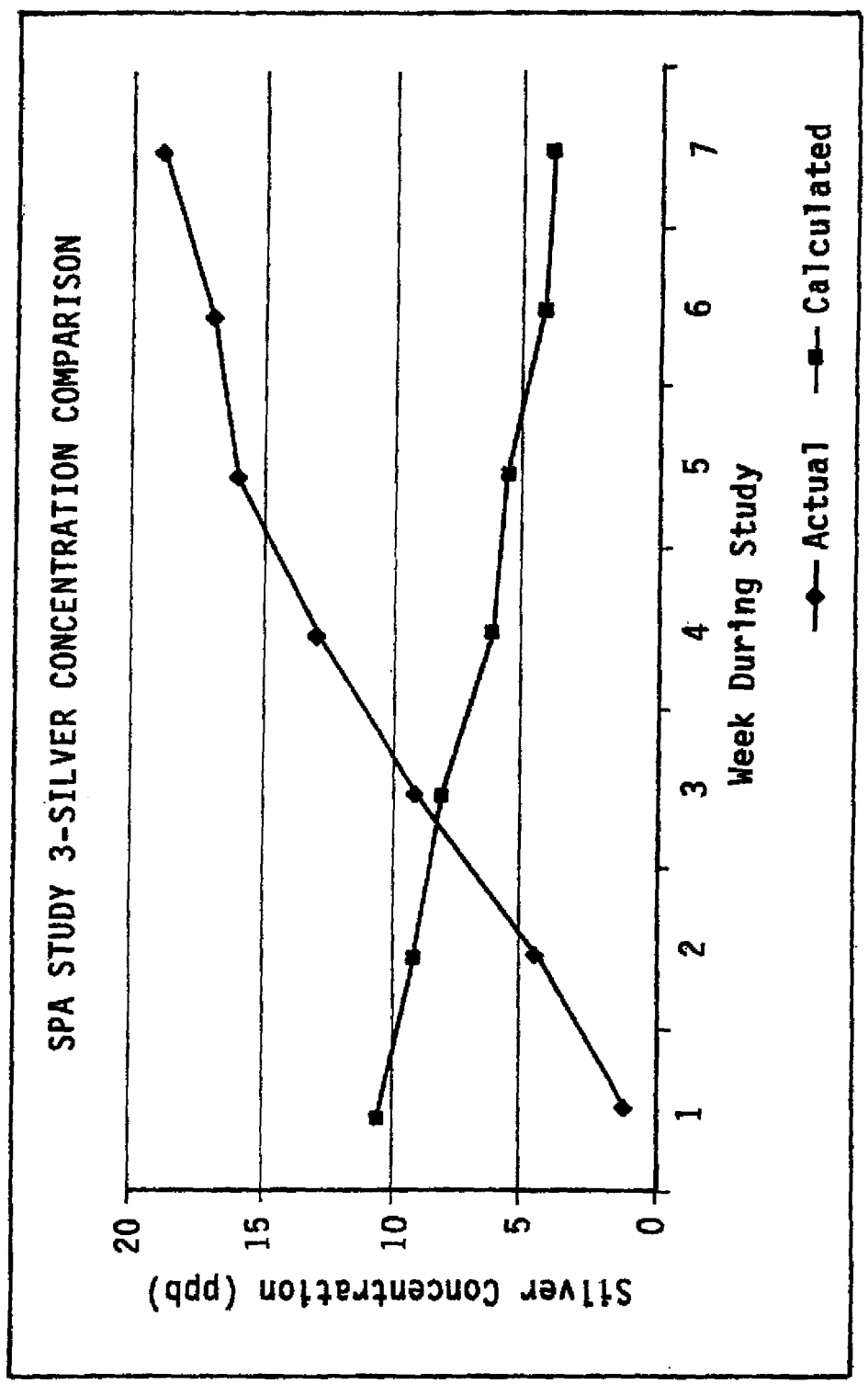
FIG. 3 shows a graph of is the measured dissolved silver concentrations each week for the duration of a Spa Study 3 as compared to the theoretical calculations.
Figure 4:
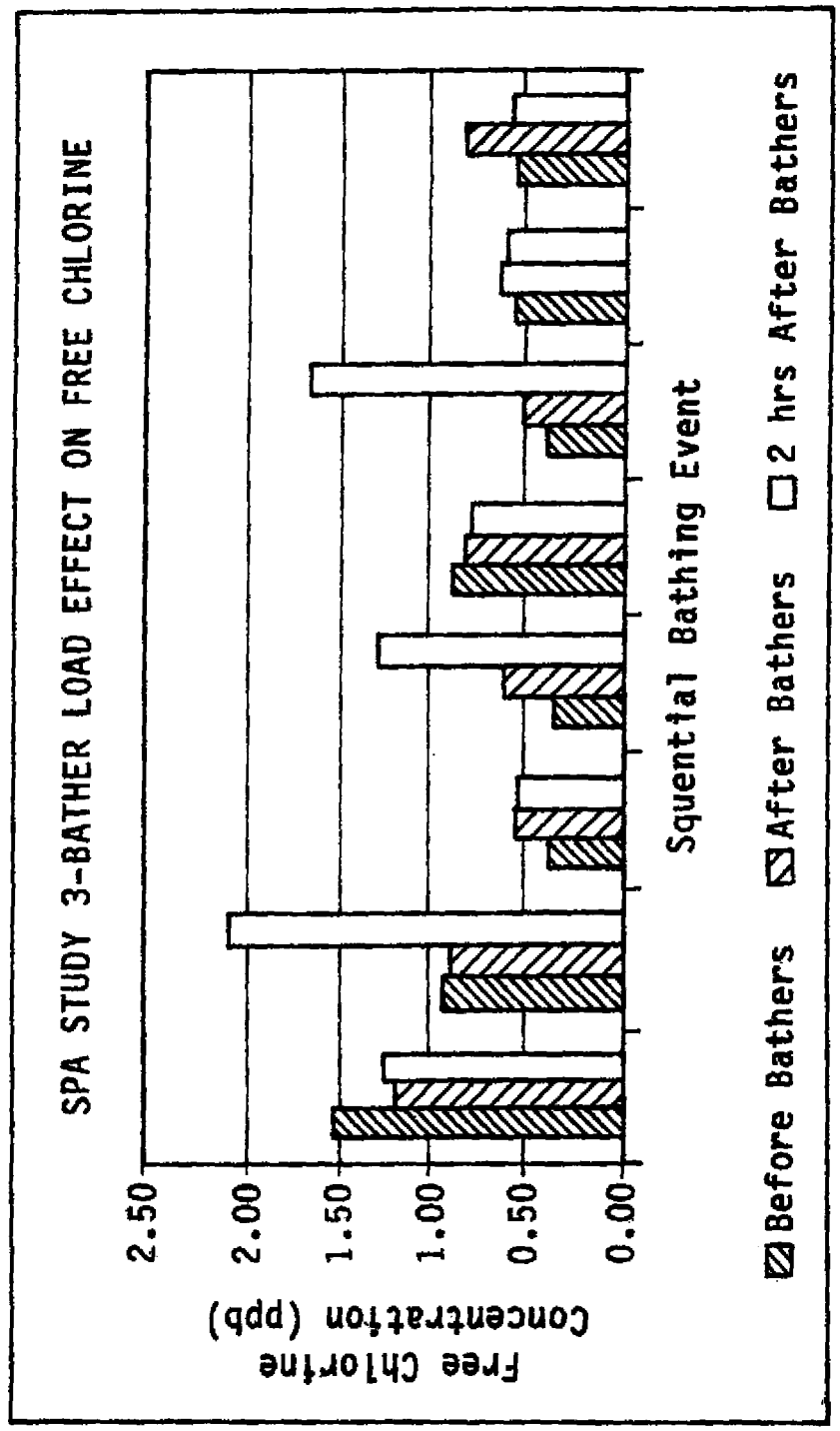
FIG. 4 is a table showing the effect that the bathers have on the spa water of Spa Study 3.

Result of the test for dissolved silver concentration are shown in FIG. 1 for Spa Study 1, are shown in FIG. 2 for Spa Study 2, and are shown in FIG. 3 for Spa Study 3. Chloride was tested during Spa Studies 2 and Spa Study 3 to provide a means to calculate the theoretical silver concentration based on the solubility product of silver chloride. FIG. 4 shows the effect that the bathers had on the spa water of Spa Study 3.

Free chlorine was measured to assess oxidizing potential for disinfection. The average levels of free chlorine in Spa Studies 1, 2, and 3 were 0.52 ppm, 0.68 and 0.79 ppm. Control of free chlorine concentrations in the observed range has not been previously possible when a solid source of chlorine has been dispensed from a simple cartridge device. It should be noted that although the aforementioned low levels of chlorine may be inadequate when DCDMH is used alone, the low levels of chlorine may be ideal for a combined used with Spa Frog Minerals. Therefore, DCDMH may be considered as an effective candidate for use with minerals in spas.

Total chlorine was measured to assess all forms of chlorine containing species present in spa water, some of which do not participate in the disinfecting process. The average total chlorine concentration for Spa Study 1 was 3.45 ppm (0.10 to 6.90 ppm range), Spa Study 2 averaged 6.16 ppm (range 0.12 to 14.4 ppm), and Spa Study 3 averaged 8.17 ppm (range 0.17 to 15.8).

DCDMH's higher than expected concentrations of total chlorine can be contributed to the structure in that DCDMH has two chlorine atoms attached to a hydantoin ring. Additionally, it is believed that only one chlorine atom detaches from the ring, while the second may remain bonded. The hydantoin backbone with the one chlorine atom attached may possibly interact with the DPD reagent used to test for the total chorine resulting in higher total chlorine reading than what really is present.

Furthermore, the high total chlorine can be utilized as a chlorine bank, when there is a high demand. That is, it is reasonable to propose that the last chlorine atom detaches itself from the hydantoin ring with higher demand for use in the disinfection process such as in the presence of high bather load demand. Also, a decrease in total chlorine concentration has been observed after the bathers exit the spa. Moreover, when the chlorine cartridge is empty the chlorine bank begins to fall and can be used as an indication that the cartridge needs to be replaced. Typically one DCDMH cartridge filled with 100 grams of DCDMH will last about 3-4 weeks depending on spa use. In view of the aforementioned, the total chlorine level may be monitored in the spa water to determine the quantity of chlorine that remains in the cartridge while the free chlorine level may be monitored in the spa water to determine disinfection potential.

FIG. 1 shows a graph of the measured dissolved silver concentrations each week for the duration of the Spa Study 1. The average dissolved silver concentration for Spa Study 1 was 16 ppb. During week 10 the chlorine measured 160 ppb. The level of silver that would be anticipated based on theoretical calculations of the chlorine would be about 4.2 ppb, however, the actual measured silver was 23 ppb. This is almost a 6-fold greater than would be anticipated.

FIG. 2 shows a graph of dissolved silver concentrations each week for Spa Study 2 as compared to the theoretical calculations based on the chlorine measurement. The average dissolved silver concentration for Spa Study 2 was 13 ppb. By the end of Spa Study 2 the measured level of silver was at least 3-fold greater than would be anticipated based on theoretical calculations.

FIG. 3 shows a graph of the dissolved silver concentrations each week for the duration of the Spa Study 3 as compared to the theoretical calculations based on the chloride measurement. The average dissolved silver concentration for Spa Study 3 was 11 ppb. By the end of Spa Study 3 the measured level of silver was at least 5-fold greater than would be anticipated based on theoretical calculations. It appears from Spa Study 3 that bathers do not have an affect on dissolved silver concentrations. It is believed that Spa Study 3 had the lowest average silver concentration because the Spa Study 3 was run for seven (7) weeks compared to the testing duration of twelve (12) and eight (18) weeks for Spa Study 1 and 2, respectively. It is anticipated that if Spa Study 3 had been tested longer in duration the average dissolved silver concentration would have mostly likely been higher.

The above results of Spa Studies 1, 2, and 3, as shown in FIGS. 1, 2, and 3 thus supports the finding that the combination of other types of N-halohydantoin compounds such as DCDMH with a metal ion donor such as silver chloride enhances a concentration of metal ions in a body of water by retaining or increasing the solubility of metal ions from other metal ion donors to retain the antimicrobial activity of the metal ions in the body of water.

Per the inventor's above findings, it is anticipated that N-halohydantoin compounds of the formula shown below can be used in this invention.

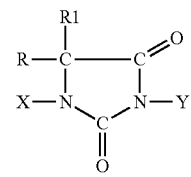

Where X is either H, Cl, or Br;
Y is either H, Cl, or Br;
R is an Alkyl group; and
R1 is an Alkyl group.

R and R1 are independently selected from alkyl groups (having from I to a plurality of carbons), and X and Y are independently selected from bromine, chlorine and hydrogen. In further regards to the above, as evidenced by the Inventor's use of the Lonza DCDMH (Dantochlor®), which comprised a combination of 1,3-Dichloro-5,5 dimethylhydantoin, 1,3-Dichloro-5-ethyl-5-methylhydantoin, and monochloro-5-methylhydantoin, a mixture of the derivatives of the above N-halohydantoin compounds can also be used.

FIG. 4 is a table showing the free chlorine concentration before and after two bathers used the spa for thirty (30) minutes increments on sequential days. The first columns correspond to the free chlorine level prior to the bathers entering the spa. The second columns represent the free chlorine level after the bathers exited the spa, and the third columns show the free chlorine concentration two hours after the bather's have exited the spa. Typically the next day after each bathing event the free chlorine stabilized between 0.5 and 1.0 ppm free chlorine even if 2 hours after spa use the free chlorine measured above 1.0 ppm. FIG. 4 also shows that when the free chlorine level is below 0.5 ppm, and bathers used the spa, the free chlorine goes up, instead of down. This can be attributed to the above-discussed chlorine-hydantoin bank, because as the demand for free chlorine goes up, the hydantoin releases the second chlorine on the ring to add to disinfection. Also the additional circulation from the jets of the spa and/or increases in water temperature may cause more DCDMH to dissolve into the spa water, and possibly increase the kinetics of the reaction.

The above results of Spa Studies 1, 2, and 3 show that: (1) spa water chlorine concentrations can be controlled when DCDMH is dispensed from a cartridge; (2) at a fixed cartridge setting, chlorine concentrations can be maintained at levels of 0.5 to 1.0 ppm and higher as needed; (3) concentrations of actual silver are 3 to 6-fold higher in spa water than would be anticipated by theoretical calculations based on silver chloride solubility; (4) that due to the unique chemistry of N-halohydantoins such as DCDMH, total chlorine concentrations behave as a chlorine bank that is readily available under conditions requiring high chlorine demand, but without the risk of over chlorination; (5) that spa water treated with N-halohydantoins such as DCDMH is as clear as, if not clearer, then water treated with N-halohydantoins such as BCDMH; and (6) that after spa water has been balanced according to the saturation index, pH remains in a more neutral range (pH 7.4) as compared to spa water treated with N-halohydantoins such as BCDMH.

Apparatus

Figure 5:
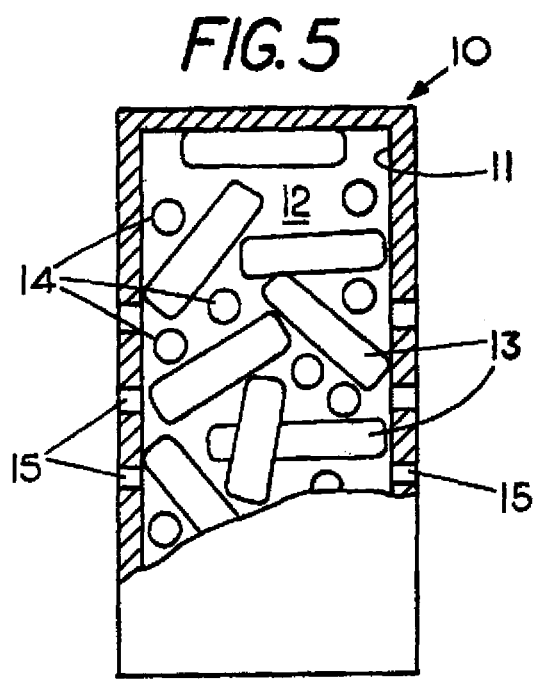
FIG. 5 shows a dispenser having a housing with a compartment containing a source of N-halohydantoin and a silver ion donor comprising silver chloride therein.
Figure 6:
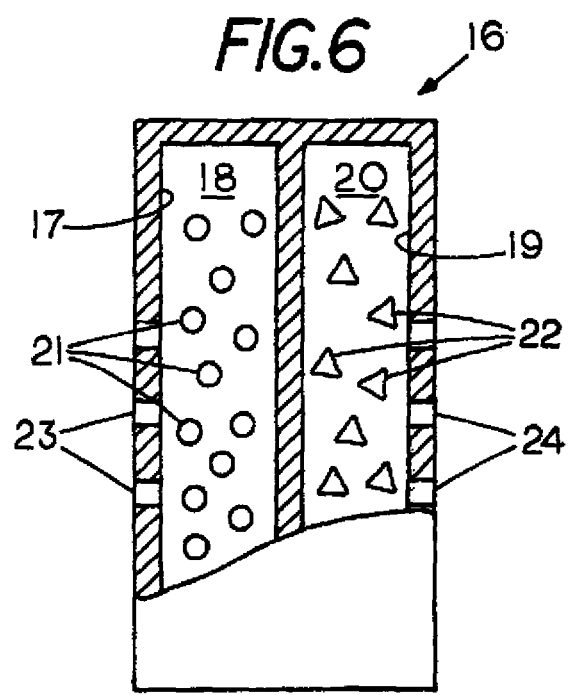
FIG. 6 shows a dispenser having a first housing containing a source of N-halohydantoin and a second housing containing silver ion donor comprising silver chloride therein.

Referring to FIGS. 5 and 6, FIG. 5 shows an embodiment of an apparatus of the present invention comprising a dispenser 10 having a housing 11 containing a compartment 12 therein. Located in compartment 12 is a source of a N-halohydantoin compound such as DCDMH 13 and a bactericide comprising a silver ion donor such as silver chloride 14. A set of openings 15 allows water access to compartment 12 and to the source of DCDMH 13 and the silver chloride 14.

FIG. 6 shows an alternative embodiment of an apparatus of the present invention comprising a dispenser 16 having a first housing 17 containing a compartment 18 and a second housing 19 with a compartment 20 therein. Located in compartment 18 is a silver ion donor such as silver chloride 21 and located in compartment 20 is a source of a N-halohydantoin compound 22. A set of openings 23 allows water access to compartment 18 and to the silver chloride 21. Similarly, a set of openings 24 allows water access to compartment 20 and the source of N-halohydantoin compound 22. Although FIGS. 5 and 6 shows the use of the silver ion donor as comprising silver chloride, other types of silver ion donors and other alternative bactericides whose solubility can be changed in the presence of N-halohydantoin compound can also be used such as silver bromide.

In regards to the source of N-halohydantoin compound 13, 22, FIG. 6 shows the source of N-halohydantoin compound 22 in particle form with the aforementioned particles having an initial size that is larger than the size of opening 23 to prevent the N-halohydantoin compound particles from escaping through opening 23. FIG. 5 shows the source of N-halohydantoin compound 13 in tablet form. Various types of material, including but not limited to microcrystalline cellulose (MCC), may be used as a binder in the formation of the N-halohydantoin compound tablets which are tabletized with the metal ion donor so that both the N-halohydantoin compound and the metal ion donor can be placed in the body of fluid to be treated.

The present invention includes the step of placing the dispenser 10, 16 containing both the source of N-halohydantoin compound 13, 22 and the silver chloride 14, 21 in the body of water such as a body of water support in a spa, hot tub or swimming pool and allowing water to come into contact with the source of N-halohydantoin compound 13, 22 and the silver chloride 14, 21 to periodically release N-halohydantoin compound and silver ions into the body of water. As the N-halohydantoin compound is released into the body of water, the N-halohydantoin compound is carried to the silver chloride 14, 21 and interacts with the silver chloride 14, 21 to increase the solubility of the silver thereby allowing for the release of more silver ions into the body of water than the silver chloride 14, 21 alone.

The present invention can also include a method of treating a body of water to kill microorganisms by maintaining an effective concentration biocides comprising the steps of: (1) adding a silver salt 14, 21 to the body of water such as a body of water support in a spa, hot tub or swimming pool; and (2) adding a concentration N-halohydantoin compound 13, 22 to the body of water to interact with the silver salt 14, 21 to maintain a silver ion concentration effective to kill microorganisms. The aforementioned method can also include the steps of (3) adding silver chloride 14, 21 to the body of water; (4) adding silver bromide to the body of water; (5) treating a body of recreational water for at least partial human immersion therein; (6) placing a dispenser 10, 16 containing both the silver salt 14, 21 and the N-halohydantoin compound 13, 22 in the body of water and allowing water to come into contact with both the silver salt 14, 21 and the N-halohydantoin compound 13, 22; (7) adding silver chloride to the body of water on a carrier of limestone; and (8) increasing the temperature of the body of water to increase the dissolution of the N-halohydantoin compound 13, 22 in the body of water.

We claim:

1. A method of controlling free chlorine concentration in a body of water using a solid source of chlorine, the method comprising using a dispenser for killing microorganisms in the body of water by placing the dispenser in aqueous communication with the body of water to provide therein an average level of free chlorine ranging from 0.52 ppm to 0.79 ppm, the dispenser comprising:

a first housing having a water accessible compartment containing a source of at least one N-halohydantoin compound for releasing the at least one N-halohydantoin compound when contacted by the body of water, wherein the at least one N-halohydantoin compound comprises dichlorodimethylhydantoin (DCDMH), which comprises two chlorine atoms attached to a hydantoin ring, such that the at least one N-halohydantoin has the formula:

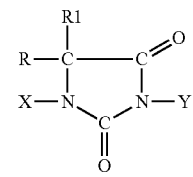

wherein R and R1 each independently comprises an alkyl group, and wherein X and Y are each chlorine; and a second housing having a water accessible compartment containing a metal ion donor for releasing metal ions when contacted by the body of water containing the at least one N-halohydantoin, the metal ion donor comprising solid silver chloride.

2. The method of claim 1 wherein the dichlorodimethylhydantoin (DCDMH) comprises 1,3-Dichloro-5,5-dimethylhydantoin.

3. The method of claim 1 wherein the dichlorodimethylhydantoin (DCDMH) comprises a combination of 1,3-Dichloro-5,5-dimethylhydantoin, 1,3-Dichloro-5-ethyl-5-methylhydantoin, and monochloro-5-methylhydantoin.

4. The method of claim 1 wherein the first housing and the second housing are located in the dispenser having a set of openings for ingress and egress of the water into the compartments in the dispenser.

5. The method of claim 1 wherein the dichlorodimethylhydantoin (DCDMH) is provided at a mass of about 75-100 grams.

6. The method of claim 1 wherein the first housing has a set of openings allowing the water to access the water accessible compartment containing the source of the at least one N-halohydantoin compound.

7. The method of claim 6 wherein the source of the at least one N-halohydantoin compound is in particle form with particles having a size larger than a size of the openings.

8. The method of claim 1 wherein the body of water is a spa, hot tub, or swimming pool.

* * * * *